(12) United States Patent
Masaki

(10) Patent No.: US 10,365,793 B2
(45) Date of Patent: Jul. 30, 2019

(54) ELECTRONIC APPARATUS AND METHOD FOR DISPLAYING SORTING RULES ON A DISPLAY

(71) Applicant: KYOCERA CORPORATION, Kyoto (JP)

(72) Inventor: Kana Masaki, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 333 days.

(21) Appl. No.: 15/248,960

(22) Filed: Aug. 26, 2016

(65) Prior Publication Data

US 2016/0364098 A1 Dec. 15, 2016

Related U.S. Application Data

(63) Continuation of application No. PCT/JP2015/074351, filed on Aug. 28, 2015.

(30) Foreign Application Priority Data

Aug. 28, 2014 (JP) ................................ 2014-174468

(51) Int. Cl.
*G06F 3/048* (2013.01)
*G06F 3/0482* (2013.01)
(Continued)

(52) U.S. Cl.
CPC ............ *G06F 3/0482* (2013.01); *G06F 3/048* (2013.01); *G06F 16/58* (2019.01); *G06F 16/951* (2019.01)

(58) Field of Classification Search
CPC .. G06F 3/0481; G06F 3/04817; G06F 3/0482; G06F 3/048; G06F 16/58; G06F 16/951
See application file for complete search history.

(56) References Cited

U.S. PATENT DOCUMENTS 9,460,667 B2 10/2016 Bozarth et al.
2005/0246331 A1* 11/2005 De Vorchik ...... G06F 17/30126
(Continued)

FOREIGN PATENT DOCUMENTS

JP 2011-134294 7/2011
JP 2013-175091 9/2013
(Continued)

OTHER PUBLICATIONS

Official Action in Japanese Patent Application No. 2016-052084, dated Mar. 14, 2017, and Statement of Relevance of Non-English References Cited Therein, in 4 pages.
(Continued)

*Primary Examiner* — Aaron Lowenberger
(74) *Attorney, Agent, or Firm* — Duane Morris LLP

(57) ABSTRACT

An electronic apparatus is disclosed. In one embodiment, a first functional unit is configured to execute a predetermined function and to acquire, during execution of the predetermined function, first attribute information for use in performing sorting according to a first sorting rule. A second functional unit is configured to display, on a display, display target information including first display target information, to perform a first sort display in which the first sorting rule is displayed when the first display target information related to the first attribute information is stored in a second storage area and the first sorting rule is not displayed when the first display target information related to first attribute information is not stored in the second storage, and to sort the first display target information according to the first sorting rule selected by using the input unit and display the sorted information on the display.

10 Claims, 13 Drawing Sheets

(51) Int. Cl.
*G06F 16/951* (2019.01)
*G06F 16/58* (2019.01)

(56) References Cited

U.S. PATENT DOCUMENTS

| | | | |
|---|---|---|---|
| 2012/0081382 A1* | 4/2012 | Lindahl | G06T 11/00 |
| | | | 345/581 |
| 2012/0229505 A1* | 9/2012 | Kuga | G01C 21/00 |
| | | | 345/629 |
| 2013/0135215 A1 | 5/2013 | Bozarth et al. | |
| 2014/0189594 A1 | 7/2014 | Hashiba | |
| 2014/0288680 A1* | 9/2014 | Hoffman | G06K 9/00342 |
| | | | 700/91 |
| 2015/0206512 A1 | 7/2015 | Kuga | |

FOREIGN PATENT DOCUMENTS

| | | |
|---|---|---|
| JP | 2014-038376 | 2/2014 |
| JP | 2014-127160 | 7/2014 |
| WO | WO 2013/082135 A1 | 6/2013 |

OTHER PUBLICATIONS

Japanese Official Action in Japanese Patent Application No. 2016-052084 dated Oct. 11, 2016 and Statement of Relevance of Non-English References Cited Therein, in 3 pages.

International Search Report in International Patent Application No. PCT/JP2015/074351, dated Oct. 13, 2015, in 1 page.

Written Opinion of the International Searching Authority in International Patent Application No. PCT/JP2015/074351, dated Oct. 13, 2015, and Statement of Relevance of Non-English References Cited Therein, in 4 pages.

* cited by examiner

FIG. 8
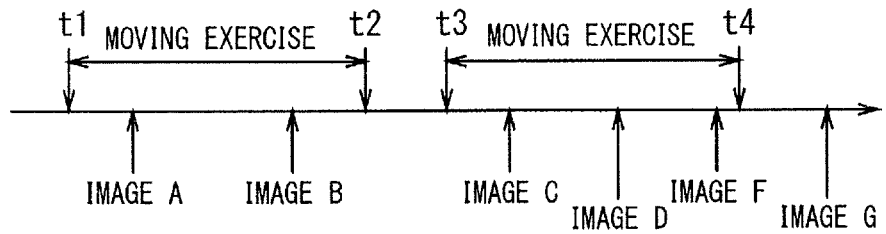
FIG. 9
| SPECIFICATION INFORMATION | FIRST ATTRIBUTE INFORMATION | | |
|---|---|---|---|
| EXERCISE PERIOD | WEATHER INFORMATION | FEELING INFORMATION | ROUTE INFORMATION |
| t1~t2 | SUNNY | GOOD | ROUTE R1 |
| t3~t4 | CLOUDY | INDIFFERENT | ROUTE R2 |
FIG. 10
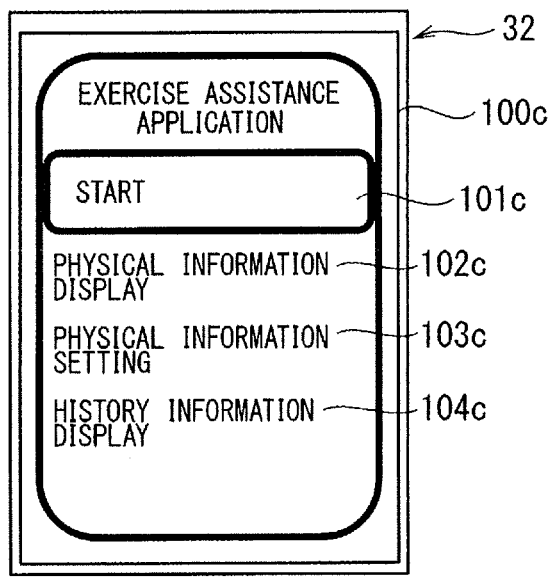

| SPECIFICATION INFORMATION | FIRST ATTRIBUTE INFORMATION | | |
|---|---|---|---|
| EXERCISE PERIOD | WEATHER INFORMATION | FEELING INFORMATION | ROUTE INFORMATION |
| t1~t2 | – | GOOD | ROUTE R1 |
| t3~t4 | – | – | ROUTE R2 |

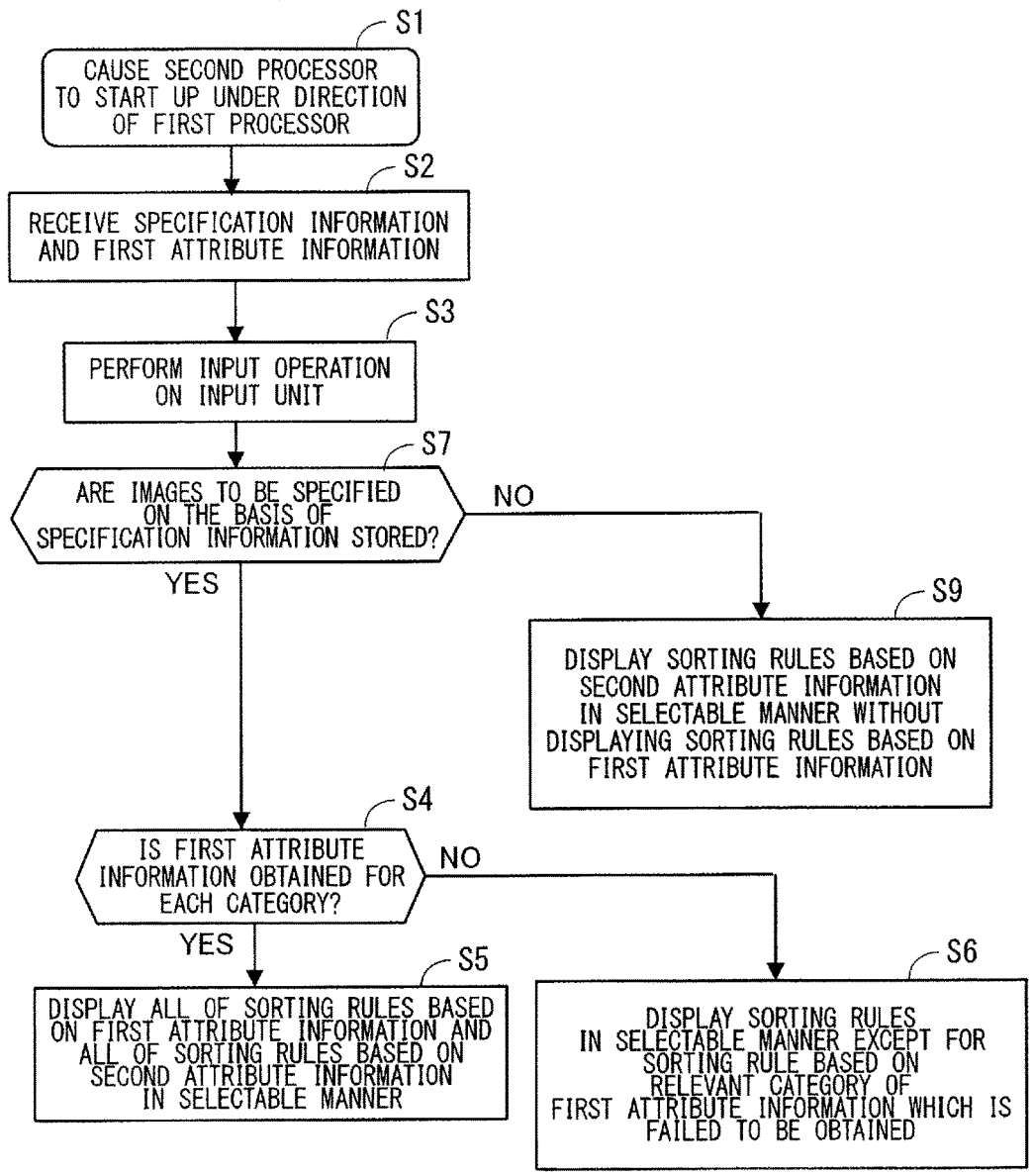

ELECTRONIC APPARATUS AND METHOD FOR DISPLAYING SORTING RULES ON A DISPLAY

CROSS-REFERENCE TO RELATED APPLICATION

The present application is a continuation based on PCT Application No. PCT/JP2015/074351, filed on Aug. 28, 2015, which claims the benefit of Japanese Application No. 2014-174468, filed on Aug. 28, 2014. PCT Application No. PCT/JP2015/074351 is entitled "ELECTRONIC DEVICE" and Japanese Application No. 2014-174468 is entitled "ELECTRONIC APPARATUS". The contents of which are incorporated by reference herein in their entirety.

FIELD

Embodiments of the present disclosure relate to electronic apparatuses.

BACKGROUND

Various techniques are known which enable a display of a mobile terminal to display a plurality of images. The display performs, for example, a sort function to display the plurality of images.

SUMMARY

An electronic apparatus is disclosed. In one embodiment, an electronic apparatus comprises a display, an input unit, and at least one processor including a first functional unit and a second functional unit. The first functional unit is configured to (i-1) execute a predetermined function, and (i-2) acquire, during execution of the predetermined function, first attribute information for use in performing sorting according to a first sorting rule and store the first attribute information in a first storage area. The second functional unit is configured to (ii-1) display, on the display, a plurality of pieces of display target information including a plurality of pieces of first display target information acquired during the execution of the predetermined function and stored in a second storage area, (ii-2) perform a first sort display in which (ii-2-1) the first sorting rule is displayed on the display when at least one of the plurality of pieces of first display target information related to the first attribute information is stored in the second storage area, (ii-2-2) the first sorting rule is not displayed on the display when none of the plurality of pieces of first display target information related to the first attribute information is stored in the second storage area, and (ii-3) sort the plurality of pieces of first display target information according to the first sorting rule selected by using the input unit and display the sorted pieces of first display target information on the display.

BRIEF DESCRIPTION OF THE DRAWINGS

FIG. 8 illustrates a diagram showing an example of the correspondence between a moving exercise and images.

FIG. 9 illustrates an example of the correspondence between specification information and first attribute information.

FIG. 10 schematically illustrates an example of the display screen.

FIG. 18 illustrates a flowchart for describing an example of the operation of the sorting rule display unit.

DETAILED DESCRIPTION

First Embodiment

<1. External Appearance of Electronic Apparatus>

Figure 1:
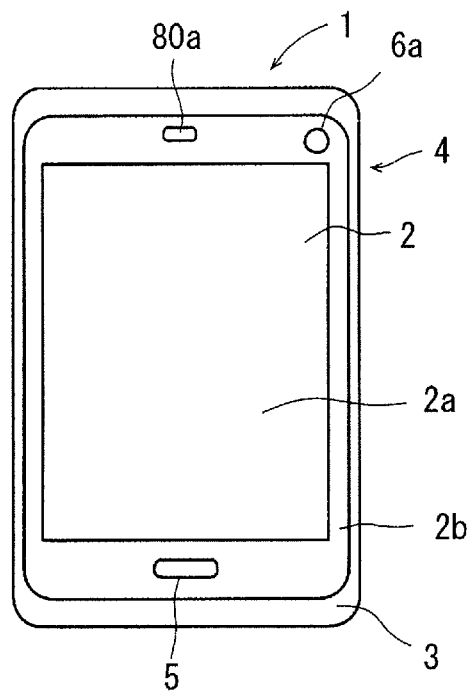
FIG. 1 illustrates a schematic perspective view of an example of an external appearance of an electronic apparatus.
Figure 2:
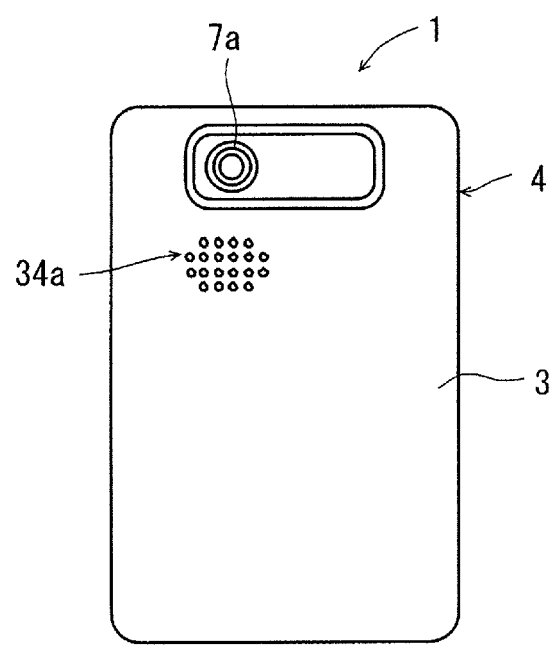
FIG. 2 illustrates a schematic rear view of an example of the external appearance of the electronic apparatus.

FIG. 1 illustrates a perspective view of an external appearance of an electronic apparatus viewed from the front surface side thereof. Here, functions of the above-mentioned electronic apparatus are installed in an electronic apparatus 1. Thus, FIG. 1 is regarded as a perspective view of an external appearance of the electronic apparatus 1. FIG. 2 illustrates a rear view of the external appearance of the electronic apparatus 1. The electronic apparatus 1 is, for example, a mobile phone (such as a smartphone), a tablet, a personal digital assistant (PDA), or a wearable electronic apparatus (e.g., a smartwatch or an eyewear electronic apparatus). The electronic apparatus 1 can communicate with another communication device directly or via a base station, a server, or the like.

As illustrated in FIGS. 1 and 2, the electronic apparatus 1 includes a cover panel 2 and a case part 3. The cover panel 2 and the case part 3 are combined to form a housing (hereinafter also referred to as an "apparatus case") 4 having an approximately rectangular plate shape in a plan view.

The cover panel 2, which has an approximately rectangular shape in a plan view, forms the front surface part of the electronic apparatus 1 except for the periphery of the front surface part. The cover panel 2 is made of, for example, transparent glass or a transparent acrylic resin. In some embodiments, the cover panel 2 is made of, for example, sapphire. Here, sapphire refers to a single crystal based on aluminum oxide ($Al_2O_3$). Herein, sapphire refers to a single crystal having a purity of $Al_2O_3$ of approximately 90% or more. The purity of $Al_2O_3$ is preferably equal to or greater than 99%, which provides a greater resistance to damage. Also, the cover panel 2 is made of, for example, diamond, zirconia, titania, crystal, lithium tantalite, or aluminum oxynitride. Similarly, each of these materials is preferably a single crystal having a purity of approximately 90% or more, which provides a greater resistance of damage.

The cover panel 2 may be a multilayer composite panel (laminated panel) including a layer made of sapphire. For example, the cover panel 2 may be a double-layer composite panel including a layer (a sapphire panel) made of sapphire and disposed on the surface of the electronic apparatus 1 and a layer (a glass panel) made of glass and laminated on the layer. The cover panel 2 may be a triple-layer composite panel including a layer (a sapphire panel) made of sapphire and disposed on the surface of the electronic apparatus 1, a layer (a glass panel) made of glass and laminated on the sapphire panel, and another layer (another sapphire panel) made of sapphire and laminated on the glass panel. The cover panel 2 may also include layers made of crystalline materials other than sapphire, such as diamond, zirconia, titania, crystal, lithium tantalite, and aluminum oxynitride.

The case part 3 forms the periphery of the front surface part, the side surface part, and the rear surface part of the electronic apparatus 1. The case part 3 is made of, for example, a polycarbonate resin.

The front surface of the cover panel 2 includes a display area 2a in which a variety of information such as characters, signs, graphics, or images is displayed. The display area 2a has, for example, a rectangular shape in a plan view. A periphery 2b of cover panel 2 that surrounds the display area 2a is opaque and/or not transparent because of, for example, a film laminated thereon, and thus, is a non-display part in which no information is displayed. On the rear surface of the cover panel 2 is laminated a touch panel 70, which will be described below. The user can provide various instructions to the electronic apparatus 1 by performing operations on the display area 2a of the front surface of the electronic apparatus 1 with, for example, a finger. Also, the user can provide various instructions to the electronic apparatus 1 by performing operations on the display area 2a with an operator other than fingers, that is, for example, with a pen for capacitive touch panels such as a stylus pen.

The apparatus case 4 accommodates, for example, at least one operation key 5. The individual operation key 5 is, for example, a hardware key and is disposed in, for example, the lower edge portion of the front surface of the cover panel 2.

<2. Electrical Configuration of Electronic Apparatus>

Figure 3:
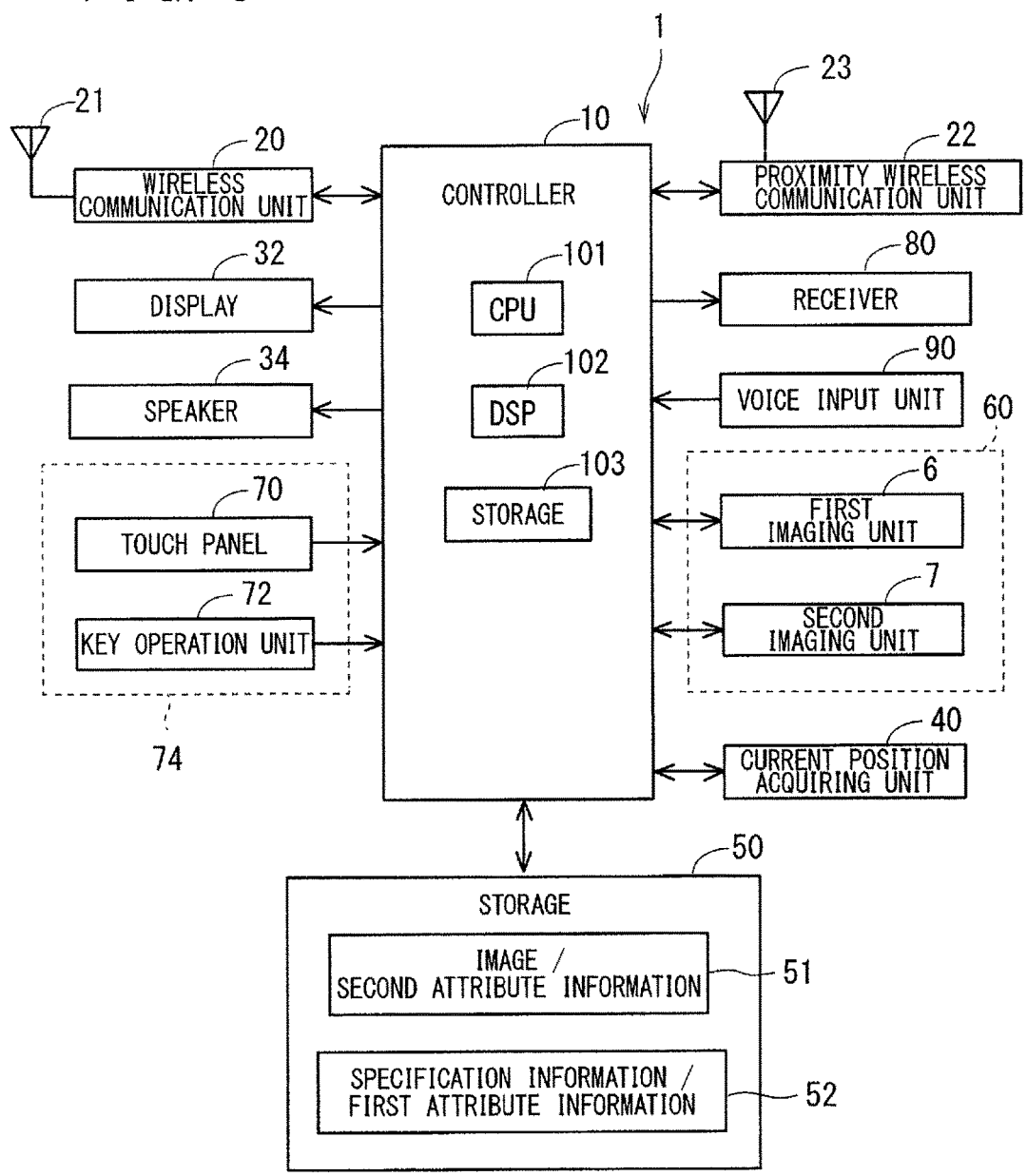
FIG. 3 schematically illustrates an example of the electrical configuration of the electronic apparatus.

FIG. 3 illustrates a block diagram showing the electrical configuration of the electronic apparatus 1. As illustrated in FIG. 3, the electronic apparatus 1 includes a controller 10, a display 32, a speaker 34, the touch panel 70, a key operation unit 72, a wireless communication unit 20, a proximity wireless communication unit 22, a receiver 80, a voice input unit 90, a first imaging unit 6, a second imaging unit 7, and a storage 50. These constituent elements of the electronic apparatus 1 are accommodated in the apparatus case 4.

The controller 10 includes, for example, a CPU (central processing unit) 101, a DSP (digital signal processor) 102, and a storage 103. The controller 10 can manage the overall operation of the electronic apparatus 1 by controlling other constituent elements of the electronic apparatus 1. The storage 103 includes, for example, a ROM (read only memory) and a RAM (random access memory). The storage 103 can store, for example, a main program and a plurality of application programs (hereinafter also simply referred to as "applications"). The main program is a control program for controlling the operation of the electronic apparatus 1, specifically, the individual constituent elements of the electronic apparatus 1 such as the wireless communication unit 20 and the display 32. The CPU 101 and the DSP 102 can execute various programs stored in the storage 103, so that various functions of the controller 10 are executed. Although a single CPU 101 and a single DSP 102 are illustrated in FIG. 3, a plurality of CPUs 101 and a plurality of DSPs 102 may be provided. The CPUs 101 and the DSPs 102 may cooperate with one another to perform the various functions. Although the storage 103 is included in the controller 10 in the example of FIG. 3, the storage 103 may be disposed outside the controller 10. That is to say, the storage 103 may be provided separately from the controller 10. Part or all of the functions of the controller 10 may be executed by hardware.

The wireless communication unit 20 is equipped with an antenna 21. In the wireless communication unit 20, the antenna 21 can receive, via a base station or the like, a signal transmitted from a mobile phone different from the electronic apparatus 1 or a signal transmitted from a communication device such as a web server connected to the Internet. The wireless communication unit 20 can perform amplification and down-conversion on the reception signal, and output the resultant signal to the controller 10. The controller 10 can perform demodulation and the like on the input reception signal. Further, the wireless communication unit 20 can perform up-conversion and amplification on a transmission signal generated by the controller 10, and wirelessly transmit the processed transmission signal from the antenna 21. The transmission signal from the antenna 21 is received, via the base station or the like, by a mobile phone different from the electronic apparatus 1 or a communication device connected to the Internet.

The proximity wireless communication unit 22 is equipped with an antenna 23. The proximity wireless communication unit 22 can communicate with a communication terminal that is closer to the electronic apparatus 1 than the communication target of the wireless communication unit 20 (e.g., the base station) is. The proximity wireless communication unit 22 can perform communication in accordance with, for example, Bluetooth (registered trademark) specifications.

The display 32 is, for example, a liquid crystal display panel or an organic electroluminescent (EL) panel. The display 32 is controlled by the controller 10, so that the display 32 can display a variety of information such as characters, signs, graphics, or images. The display 32 displays information in the display area 2a of the front surface of the cover panel 2. That is to say, the display 32 performs display in the display area 2a.

The touch panel 70 can detect an operation performed on the display area 2a of the cover panel 2 with an operator such as an operating finger. The touch panel 70 is, for example, a projected capacitive touch panel and is fitted to the rear surface of the cover panel 2. When the user performs an operation on the display area 2a of the cover panel 2 with an operator such as an operating finger, the touch panel 70 inputs a signal corresponding to the operation to the controller 10. The controller 10 can specify, based on the signal from the touch panel 70, the purpose of the operation performed on the display area 2a, and perform processing appropriate to the relevant screen.

The key operation unit 72 can detect press down operations of the user on the individual operation key 5. The key operation unit 72 can determine whether the individual operation key 5 is pressed down. When the operation key 5 is not pressed down, the key operation unit 72 outputs, to the controller 10, a non-operation signal indicating that no operation is performed on the operation key 5. When the operation key 5 is pressed down, the key operation 72 outputs, to the controller 10, an operation signal indicating that an operation is performed on the operation key 5. The controller 10 can thus determine whether an operation is performed on the individual operation key 5.

As an example, a touch panel 70 and a combination of the key operation unit 72 and the operation key 5 form an input unit 74.

The voice input unit 90 is a microphone. The voice input unit 90 can convert a sound input from the outside of the electronic apparatus 1 into an electrical sound signal, and output the electrical sound signal to the controller 10. The sound from the outside of the electronic apparatus 1 is received by the voice input unit 90 through a microphone hole in the front surface of the cover panel 2.

The speaker 34 is, for example, a dynamic speaker. The speaker 34 can convert an electrical sound signal from the controller 10 into a sound, and output the sound. The sound is output from the speaker 34 through speaker holes 34a in the rear surface of the electronic apparatus 1 to the outside. The volume of the sound output through the speaker holes 34a is set to be a degree such that the sound can be heard at a location away from the electronic apparatus 1. The speaker 34 can output, for example, an incoming call tone.

The first imaging unit 6 includes an imaging lens 6a, an image sensor, and the like. The first imaging unit 6 can capture still images and moving images in accordance with the control by the controller 10. For example, as illustrated in FIG. 1, the imaging lens 6a is located in the front surface of the electronic apparatus 1. Thus, the first imaging unit 6 can capture an image of an object in front of the front surface (the cover panel 2) of the electronic apparatus 1.

The second imaging unit 7 includes an imaging lens 7a, an image sensor, and the like. The second imaging unit 7 can capture still images and moving images in accordance with the control by the controller 10. For example, as illustrated in FIG. 2, the imaging lens 7a is located in the rear surface of the electronic apparatus 1. Thus, the second imaging unit 7 can capture an image of an object in front of the rear surface of the electronic apparatus 1.

The first imaging unit 6 and the second imaging unit 7 are hereinafter referred to as imaging units 60 if either imaging unit will do the job.

The receiver 80 can output a received sound, and is, for example, a dynamic speaker. The receiver 80 can convert an electrical sound signal from the controller 10 into a sound, and output the sound. The sound is output from the receiver 80 to the outside through a receiver hole 80a in the front surface of the electronic apparatus 1. The volume of the sound output from the receiver hole 80a is set to be lower than the volume of the sound output from the speaker 34 through the speaker holes 34a.

In place of the receiver 80, a piezoelectric vibration element may be disposed. The piezoelectric vibration element can be controlled by the controller and vibrate based on a sound signal. The piezoelectric vibration element is disposed on, for example, the rear surface of the cover panel 2. The vibrations of the piezoelectric vibration element based on the sound signal cause the cover panel 2 to vibrate. Thus, the vibrations of the cover panel 2 are transmitted as voice to an ear of the user. This configuration eliminates the need for the receiver hole 80a.

A current position acquiring unit 40 can acquire its current position. For example, the current position acquiring unit 40, which is a device that employs GPS (global positioning system), can receive radio waves from a satellite and determine the current position based on the radio waves. The current position includes, for example, information on the latitude and information on longitude.

The storage 103 can store various programs for performing the functions of the electronic apparatus 1. The storage 103 stores, for example, a program for performing voice calls using a voice call function, a program for displaying websites, and a program for writing, reading, transmitting, and receiving e-mails. The storage 103 also stores, for example, a program for capturing still images and moving images using the first imaging unit 6 and the second imaging unit 7, a program for watching and recording television programs, a program for controlling the playback of moving image data stored in the storage 103, and a program for controlling the playback of music data stored in the storage 103.

While executing the main program stored in the storage 103, the controller 10 reads and executes various programs stored in the storage 103. Then, the controller 10 controls other constituent elements of the electronic apparatus 1 such as the wireless communication unit 20, the display 32, and the receiver 80. Consequently, the functions or the processing corresponding to the relevant programs are executed in the electronic apparatus 1.

<3. Storage>

The storage 50 is a non-transitory recording medium which is, for example, a memory such as a ROM or a hard disk. The storage 50 can store, in a storage area 51 thereof, a plurality of images, which are examples of display target information, and second attribute information in such a manner that the individual images and the corresponding pieces of second attribute information are associated with each other. The second attribute information serves as a basis for judgment about image sorting. As will be described below, the plurality of images are sorted based on the second attribute information.

The second attribute information includes, for example, image album information, image creation date and time information, and image creation location information. The image album information includes, for example, the grouping of images based on the functions involved in the creation of images. More specifically, the album information includes, for example, a group of images captured by the imaging unit 60, a group of images acquired from the outside through the wireless communication unit 20, and a group of images recorded by a predetermined functional unit and displayed on the display 32. The predetermined functional unit is hereinafter also referred to as a screen shot function.

The image creation date and time information and the image creation location information are acquired every time an image is created. The creation date and time information is acquired by, for example, a clocking unit (e.g., a timer circuit). The creation location information is acquired by, for example, the current position acquiring unit 40.

The storage 50 can store, in a storage area 52 thereof, specification information and first attribute information. The specification information is associated with at least one of the images stored in the storage area 51. The first attribute information is different from the second attribute information and is associated with the specification information. The specification information and the first attribute information are for use in the image sorting, and will be specifically described below in detail.

Although the storage 50 is disposed separately from the controller 10 in the example of FIG. 3, the storage 50 may be disposed inside the controller 10. Although the storage 50 is illustrated as one constituent element, the storage 50 may include a plurality of storages. In such a case, the storage area 51 and the storage area 52 may be partly disposed in different storages.

<4. Controller>

Figure 4:
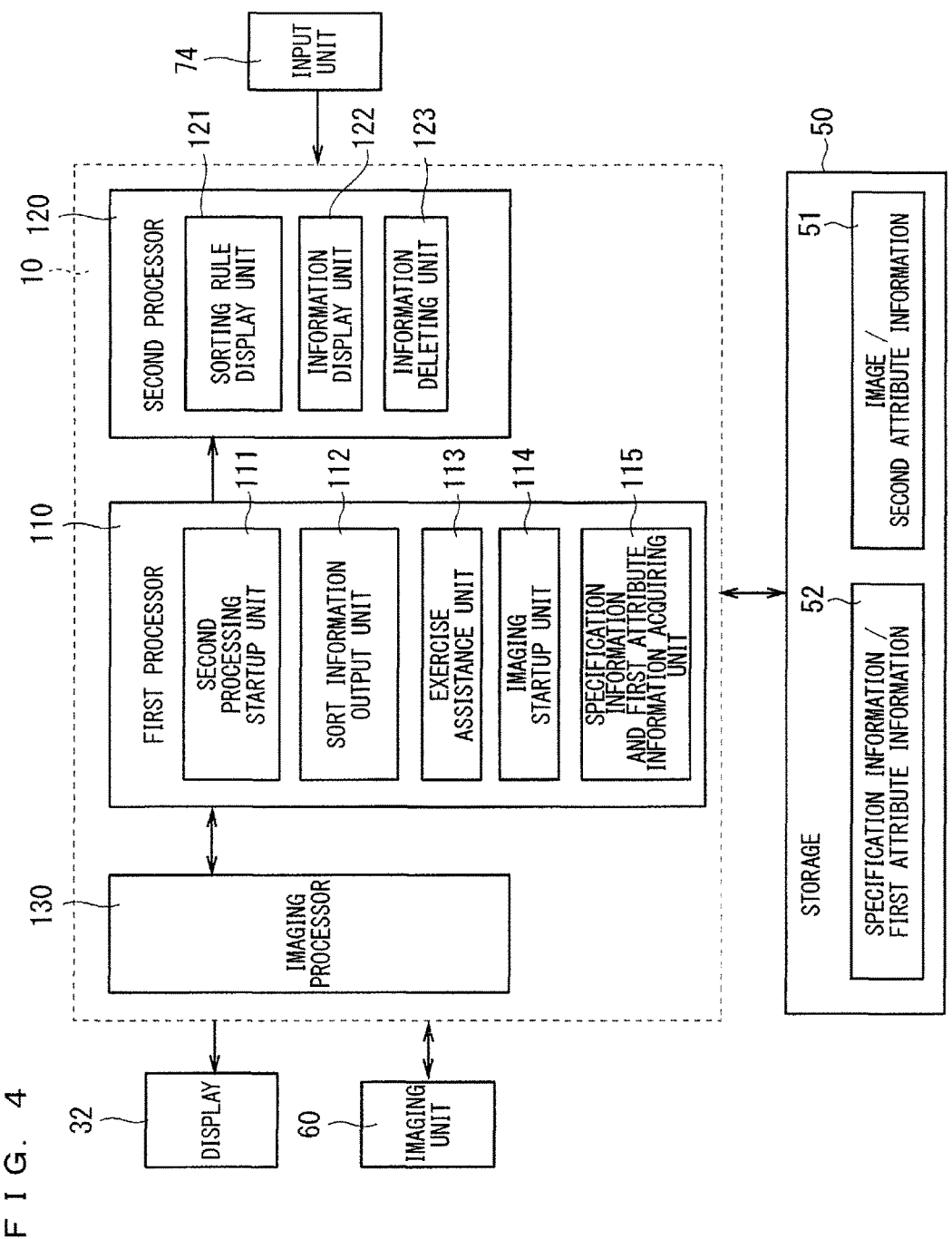
FIG. 4 schematically illustrates an example of the internal configuration a controller.

FIG. 4 illustrates a functional block diagram schematically showing an example of the specific internal configuration of the controller 10. In the example of FIG. 4, the controller 10 includes a first processor 110, a second processor 120, and an imaging processor 130, which is an example of a display target information creator. These functional units may be implemented by execution of the programs stored in the storage 103. Alternatively, part or all of these functional units may be implemented by hardware.

<4-1. Second Processor>

The second processor 120 can access the storage area 51, and thus, can display the individual images stored in the storage area 51 on the display 32. More specifically, the second processor 120 includes a sorting rule display unit 121, an information display unit 122, and an information deleting unit 123.

Figure 5:
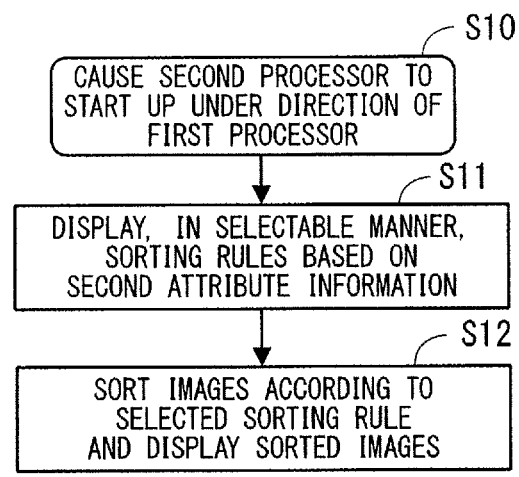
FIG. 5 illustrates a flowchart for describing an example of the operation of a second processor.

The second processor 120 starts up in response to an operation performed on the input unit 74 by the user. FIG. 5 illustrates an example of the operation of the second processor 120 at the startup under the direction of the input unit 74. In Step S10, the user performs, on the input unit 74, an input operation for causing the second processor 120 to start up. For example, the initial screen (the home screen) shows a graphic that represents the function of the second processor 120, and then, the touch panel 70 detects an operation performed on the graphic. Such an operation is, for example an operation of bringing an operator (e.g., a finger) close to or in contact with the graphic in the display area 2a and subsequently moving the operator away from the graphic. This operation is called a "tap". The description above holds true for the operation of selecting other graphics which will be described below or the operation of selecting buttons which will be described below. Thus, the description above will not be repeated.

Upon detection of the operation performed on the graphic, the touch panel 70 notifies the second processor 120 of the operation. Upon receipt of the notification, the second processor 120 regards the notification as an instruction and starts up accordingly. "Startup" means processing for enabling the functions of the processor. The instruction above can be regarded as the instruction to enable the individual functional units (e.g., the sorting rule display unit 121 and the information display unit 122) of the second processor 120. The second processor 120 is the processor that can display a plurality of images on the display 32. Thus, the instruction above can be regarded as the instruction given to the second processor 120 to display the plurality of images.

Figure 6:
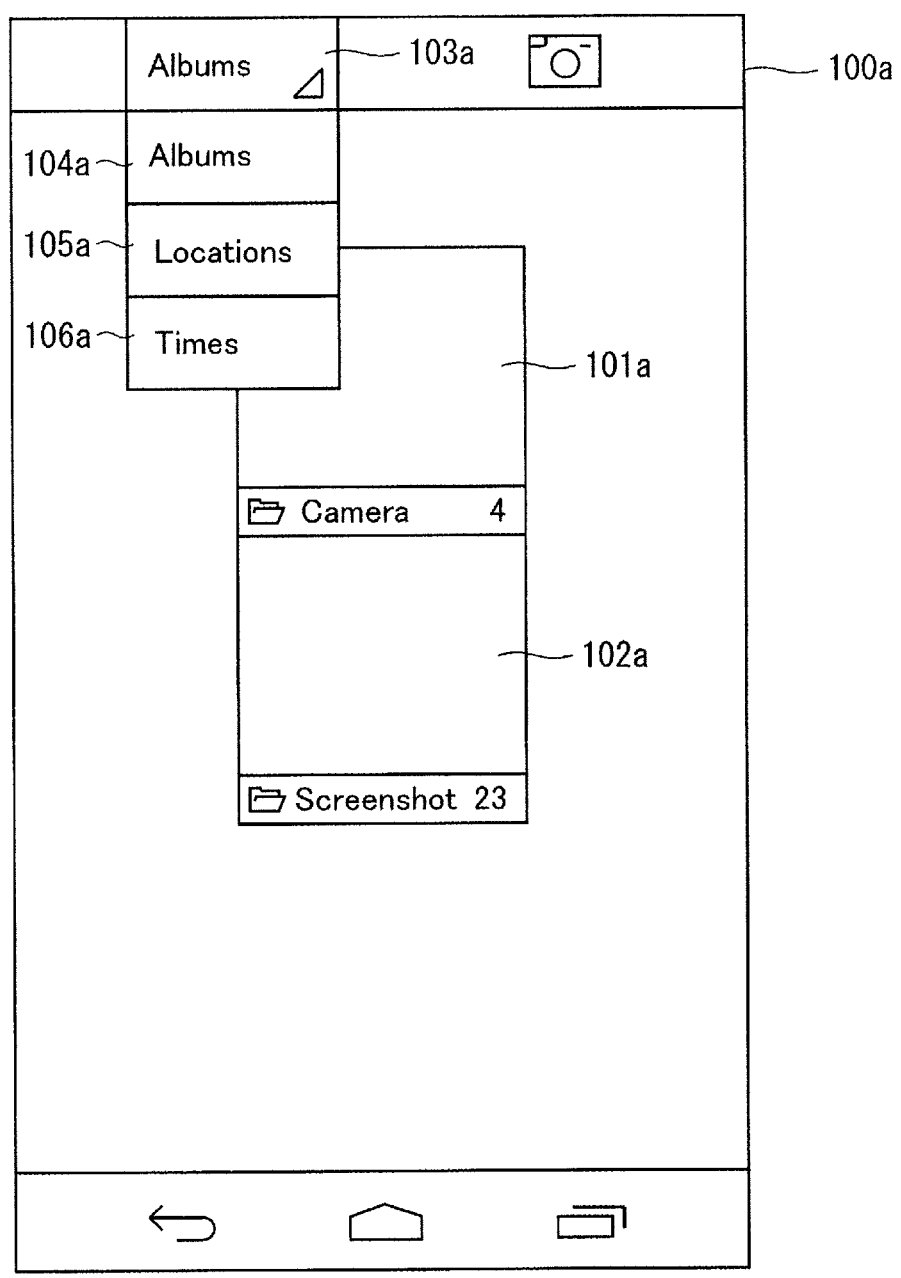
FIG. 6 schematically illustrates an example of a display screen.

FIG. 6 schematically illustrates an example of a display screen 100a displayed on the display 32 by the second processor 120. In the example of FIG. 6, the display screen 100a shows album images 101a and 102a. The album images are images representing the individual albums and are created based on the album information stored in the storage area 51. The album images 101a and 102a indicate the respective album names and the number of images stored in the respective albums. In the example of FIG. 6, "Camera" which is the album name of the album image 101a and "Screenshot" which is the album name of the album image 102a are displayed. "Camera" means that the images included in the album image 101a are captured by the imaging unit 60, and "Screenshot" means that the images included in the album image 102a are obtained by the screen shot function.

In response to an operation of the user on the album image 101a or 102a, the second processor can display, on the display 32, the images included in the respective album image in list form (not shown). That is to say, the album images 101a and 102a function as the buttons for displaying images belonging to the respective album images.

Also, the display screen 100a shows, for example, a button 103a. The button 103a is the button for displaying sorting rules. In the area occupied by the button 103a, the currently selected sorting rule is displayed. In Step S11, when the user selects the button 103a, the sorting rule display unit 121 displays, on the display 32, a list of sorting rules based on the second attribute information stored in the storage area 51 in such a manner that the appropriate sorting rule can be selected. FIG. 6 illustrates the display screen 100a showing the sorting rules. Here, the second attribute information includes the album information, the creation location information, and the creation date and time information. Thus, the display screen 100a shows the sorting rules represented by an "Albums" button 104a, a "Locations" button 105a, and a "Times" button 106a. The buttons 104a, 105a, and 106a respectively correspond to the album information, the creation location information, and the creation date and time information.

In Step S12, when the user selects any one of the buttons 104a to 106a, the information display unit 122 can sort, according to the selected sorting rule, the images stored in the storage area 51 and display the sorted images on the display 32. When the button 106a is selected, the information display unit 122 reads images and the creation date and time information from the storage area 51, sorts the images in chronological order or in reverse chronological order, and displays the sorted images. Any appropriate algorithm can be used as the sorting algorithm in this sorting processing.

It is not always required that all of the images be displayed in list form. Alternatively, the images may be grouped in predetermined units (e.g., per period of 10 days) and the individual groups may be sorted in the selected order based on the creation time and date and may be displayed in a selectable manner. When the user selects a group from the list of groups, the information display unit 122 may sort a plurality of images belonging to the selected group in the selected order based on the creation time and date and display the sorted images.

In the operation above, the images are displayed according to the sorting rule selected by the user. This configuration enables the user to find images more easily.

Although the second processor 120 starts up in response to an input operation performed on the input unit 74 by the user, the second processor 120 may start up in accordance with an instruction from the first processor 110 as will be described below in detail. When the second processor 120 starts up in accordance with the instruction from the first processor 110, the sorting rule display unit 121 can display, on the display 32, not only the sorting rules based on the second attribute information but also sorting rules based on the first attribute information. That is to say, the second processor 120 judges through which one of the input unit 74 and the first processor 110 the startup instruction is input, and displays the sorting rules based on the judgment. The operation of the second processor 120 will be described below in detail.

The information deleting unit 123 can selectively delete images stored in the storage area 51 in response to an input operation performed on the input unit 74 by the user. The user can thus organize the images stored in the storage area 51.

<4-2. First Processor>

Similarly to the above, the first processor 110 can start up in response to an input operation performed on the input unit 74 by the user. For example, the home screen shows a graphic representing the function of the first processor 110. When the graphic is selected, the first processor 110 starts up.

The first processor 110 can access the storage area 52, and thus, can manage the specification information and the first attribute information. The storage area 52 is not accessed by the second processor 120. The specification information is the information for specifying the individual images stored in the storage area 51. Although the first attribute information and the second attribute information are different from each other, one commonality between them is that they serve as a basis for judgment about the image sorting. Note that the second processor 120 does not access the storage area 52, and thus, the second processor 120 cannot acquire the specification information and the first attribute information on its own.

It is not always required that the specification information and the first attribute information be associated with all of the images stored in the storage area 51. It is only required that the specification information and the first attribute information be associated with at least part of the images stored in the storage area 51. As an example, the first processor 110 includes a function (an imaging startup unit 114) for creating images. The images created by the first processor 110 are associated with, for example, the specification information and the first attribute information.

The introductory description of exemplary functions of the first processor 110 will be given before the specification information and the first attribute information are described. In the example of FIG. 4, the first processor 110 includes a second processing startup unit 111, a sort information output unit 112, an exercise assistance unit 113, the imaging startup unit 114, and an specification information and first attribute information acquiring unit (hereinafter also simply referred to as an acquisition unit) 115. Firstly, each unit will be described below in brief outline.

<4-2-1. Outline of Each Unit of First Processor>

The exercise assistance unit 113 will be described first in brief outline. The exercise assistance unit 113 is the functional unit that can assist the user in doing exercise. The exercise assistance unit 113 can assist the user in doing, for example, a moving exercise (e.g., walking, running, or cycling). More specifically, the exercise assistance unit 113 can acquire a variety of exercise-related information (e.g., the movement distance or the movement speed) as appropriate, and display the information on the display 32 (see FIG. 7). The user can thus check the variety of information while doing exercise.

The imaging startup unit 114 can cause the imaging processor 130 to start up in response to an input operation performed on the input unit 74 by the user who is doing exercise. The imaging processor 130 can control the imaging unit 60 to capture an image. The imaging processor 130 can subject the original image captured by the imaging unit 60 to image processing (e.g., white balancing) as appropriate and store the resultant image in the storage area 51. When causing the imaging unit 60 to capture an image, the imaging processor 130 can create the second attribute information, associate the second attribute information with the relevant image, and store the information and the image in the storage area 51. In this manner, the first processor 110 can acquire the image and the second attribute information while executing a predetermined function (e.g., the function of assisting the user in doing exercise).

The imaging processor 130 can start up in response to an instruction from the input unit 74 without involvement by the first processor 110. That is to say, the user can cause the imaging processor 130 to start up and to capture an image, regardless of the moving exercise above. Also in this case, the imaging processor 130 creates the second attribute information while capturing an image, and stores the image and the second attribute information in the storage area 51.

The acquisition unit 115 can acquire the specification information and the first attribute information during the execution of the predetermined function above and store the information in the storage area 52. The specification information is the infatmation for specifying the individual images. The specification information relates to, for example, the second attribute information (e.g., the creation date and time) associated with the individual image. More specifically, the specification information indicates, for example, the exercise period from start to finish of a moving exercise. If the image creation date and time stored in the storage area 51 belongs to the exercise period, the relevant image can be specified as the image that was created during the moving exercise. In some cases, a plurality of images are captured during the moving exercise.

In such a case, the date and time of creation of each image belongs to the exercise period. Thus, all of the individual images are specified based on the specification information.

The user probably performs the moving exercise at regular or irregular intervals. FIG. 8 illustrates a diagram schematically showing an example of the correspondence between a moving exercise and images. The lateral axis of FIG. 8 indicates time. In the example of FIG. 8, the user starts the moving exercise at a point of time t1 and finishes the moving exercise at a point of time t2. Then, after a lapse of a predetermined period of time, the user restarts the moving exercise at a point of time t3. The user finishes the moving exercise at a point of time t4.

In the example of FIG. 8, images A and B are captured during the moving exercise started at the point of time t1 and finished at the point of time t2, and images C to F are captured during the moving exercise started at the pint of time t3 and finished at the point of time t4. In the example of FIG. 8, an image G is captured at a point of time that does not belong to the exercise period after the point of time t4. The images A to G are stored in the storage area 51.

Examples of the first attribute information include information on the weather, information on the feeling of the user, and information on the route taken by the user during the moving exercise. For example, after finishing the moving exercise, the user inputs information on the weather and information of his or her feeling using the input unit 74. Examples of the weather information include "Sunny", "Cloudy", and "Rainy". Examples of the feeling information include "Good", "Indifferent", and "Bad". The route information is obtained as a result of the repetitive acquisition of current positions by the current position acquiring unit 40 during the individual exercise period. The route information can be regarded as the locus of the current position.

These pieces of first attribute information are associated with the specification information. That is to say, the first attribute infounation is created per moving exercise. FIG. 9 schematically illustrates an example of the correspondence between the specification information and the first attribute information. In the example of FIG. 9, the weather information "Sunny", the feeling information "Good", and route information "Route R1" are associated with the exercise period starting at the point of time t1 and ending at the point of time t2, and the weather information "Cloudy", the feeling information "Indifferent", and route information "Route R2" are associated with the exercise period starting at the point of time t3 and ending at the point of time t4.

Thus, the weather information "Sunny", the feeling information "Indifferent", and the route information "Route R1" are indirectly associated with the images A and B, and the weather information "Cloudy", the feeling information "Indifferent", and the route information "Route R2" are indirectly associated with the images C to F. With reference to FIG. 8, the date and time of creation of the image G does not belong to the exercise period. Thus, the first attribute information is not associated with the image G, neither directly nor indirectly.

The second processor 120 cannot be notified of the correspondence between the images and the first attribute information because the second processor 120 does not access the storage area 52 as mentioned above. Thus, as described above, the specification information is provided such that the individual image can be specified based on the second attribute information accessible to the second processor 120. For example, if the date and time information belongs to the exercise period as mentioned above, the image associated with the date and time information can be specified based on the specification information. The specification information is transmitted from the first processor 110 to the second processor 120 as will be described below. The second processor 120 can specify the relevant image based on the specification information and the second attribute information accordingly. For example, the second processor 120 can specify the relevant image based on the exercise period and the image creation date and time information as mentioned above. The first attribute information associated with the specification information is also transmitted to the second processor 120, so that the second processor 120 can find the correspondence between the first attribute information and the relevant image specified as described above. That is to say, in order to establish the indirect correspondence between the first attribute information and the individual image, the acquisition unit 115 acquires the specification information for specifying the relevant image based on the second attribute information accessible to the second processor and the first attribute information associated with the specification information, and stores the specification information and the first attribute information in the storage area 51.

The second processing startup unit 111 can cause the second processor 120 to start up in response to an input operation performed on the input unit 74 by the user. Every time the second processing startup unit 111 causes the second processor 120 to start up, the sort information output unit 112 can output the specification information and the first attribute information to the second processor 120.

When starting up under the direction of the first processor 110, the second processor 120 receives the specification information and the first attribute information, and accordingly, performs the sort function using not only the second attribute information but also the first attribute information. This point will be described below in detail.

<4-2-2. Details of Each Unit of First Processor>
<4-2-2-1. Exercise Assistance Operation and Creation of Specification Information and First Attribute Information>

When starting up in response to an input operation of the user on the input unit 74, the exercise assistance unit 113 causes the display 32 to display, for example, a menu screen 100c. FIG. 10 schematically illustrates an example of the menu screen 100c. In the example of FIG. 10, the menu screen 100c includes a "start" button 101c, a "physical information display" button 102c, a "physical information setting" button 103c, and a "history information display" button 104c.

The button 103c is the button for performing setting of the user's physical information. When the button 103c is selected, the screen (not shown) through which the user's physical information such as the height, the weight, and the age can be input is displayed. The user inputs his or her own physical information, and then, the input physical information is stored in a storage (e.g., the storage 50). The button 102c is the button for displaying the user's physical information. When the button 102c is selected, the user's physical information is displayed.

Figure 7:
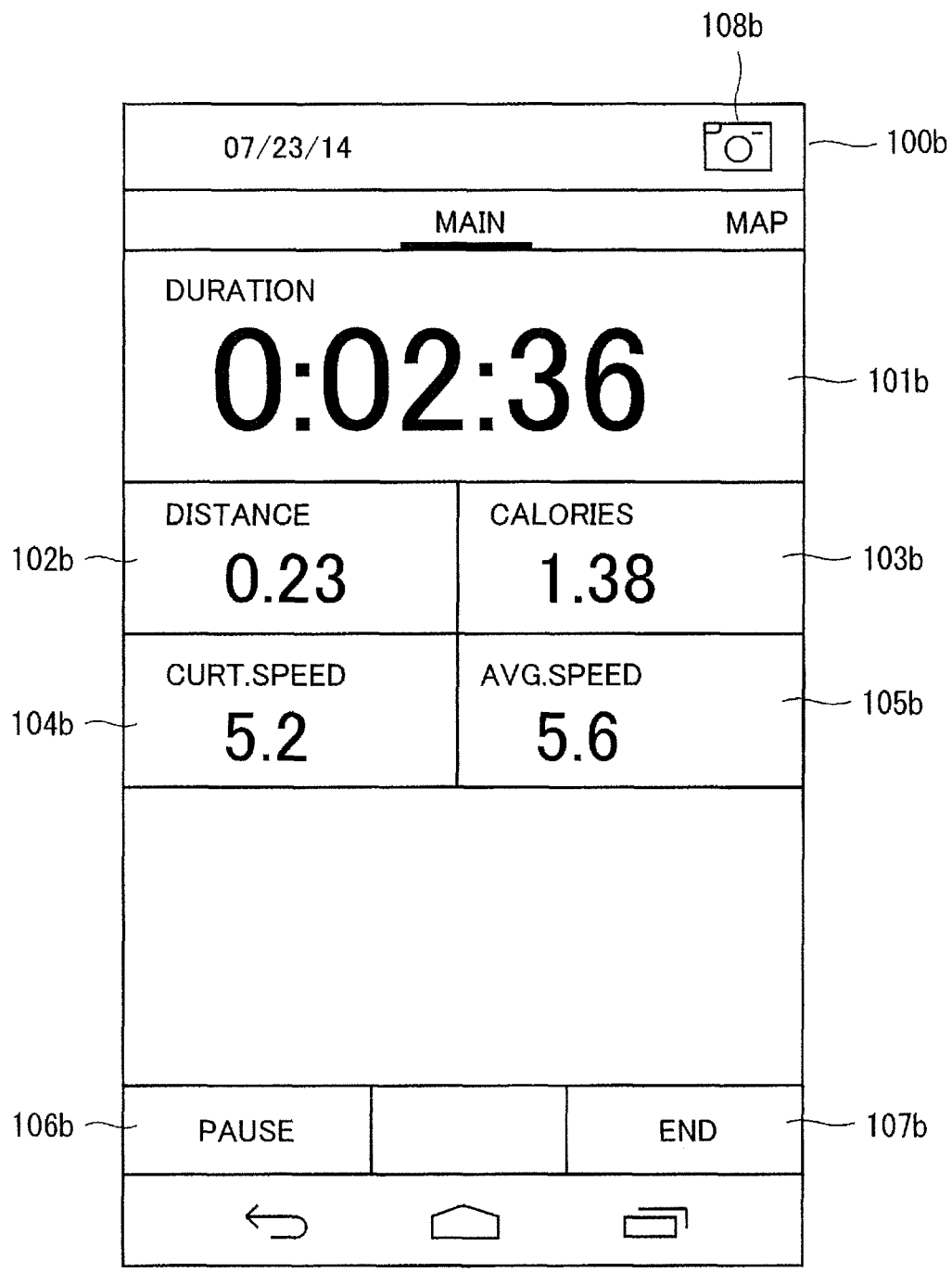
FIG. 7 schematically illustrates an example of the display screen.

The user selects the button 101c and starts a moving exercise. In response to the selection of the button 101e, the exercise assistance unit 113 starts the exercise assistance operation and displays a display screen 100b. FIG. 7 schematically illustrates an example of the display screen 100b. The display screen 100b includes a movement duration area 101b, a movement distance area 102b, a calorie consumption area 103b, a current speed area 104b, an average speed area 105b, a "Pause" button 106b, an "End" button 107b, and an "imaging startup" button 108b.

In the movement duration area 101b is displayed how much time has elapsed since the button 101c was selected. The time elapsed is measured by the clocking unit (e.g., a counter circuit). When the "Pause" button 106b is selected, the measurement of time elapsed is suspended.

In the movement distance area 102b is displayed how much distance the user has traveled since the button 101c was selected. The movement distance is calculated by the exercise assistance unit 113 based on, for example, current positions repetitively acquired by the current position acquiring unit 40. For example, the movement distance is obtained by sequentially adding each distance between the individual current position and the previously acquired current position.

In the calorie consumption area 103b is displayed calories consumed. To put it simply, the calories consumed can be regarded as the product of the user's weight and the movement distance. For example, when the user selects the "physical information setting" button 103c (see FIG. 10) and inputs his or her own weight, the exercise assistance unit 113 can recognize the user's weight. The input weight is stored in a storage (e.g., the storage 50).

In the current speed area 104b and the average speed area 105b are respectively displayed the movement speed at the present point in time and the average value of the movement speed measured over the period between the instance when the button 101c was selected and the present point in time. These values are computed by the exercise assistance unit 113 based on the duration and the distance.

When the button 106b is selected, the measurement of time elapsed is suspended as mentioned above. When the button 106b is selected again, the measurement of time elapsed is resumed.

When finishing the moving exercise, the user selects the button 107b. In response to the selection of the button 107b, the exercise assistance unit 113 terminates the exercise assistance operation. That is to say, the updating of a variety of information (e.g., the time elapsed, the movement distance, the calories consumed, the current movement speed, and the average value of the movement speed) is stopped.

The most recently acquired pieces of information are stored in a storage (e.g., the storage 50) such that these pieces of information can be displayed as the history information as will be described below.

While doing the moving exercise, the user can select the button 108b to cause the imaging processor 130 to start up. That is to say, in response to the selection of the button 108b, the imaging startup unit 114 can cause the imaging processor 130 to start up. Then, the imaging processor 130 can display a display screen for imaging (not shown) on the display 32. The display screen for imaging includes an imaging area and an "imaging" button. The imaging processor 130 can input an original image captured by the imaging unit 60, subject the original image to image processing (e.g., white balancing), and display the resultant image in the imaging area. The user can change the orientation of the imaging unit 60 in such a manner that the desired image is displayed. When the user selects the "imaging" button, the imaging processor 130 stores the relevant image in the storage area 51. The imaging processor 130 can acquire the image creation time and date through the clocking unit or the like and acquire the image creation location through the current position acquiring unit 40 or the like. The imaging processor 130 can associate the relevant image, the creation time, and the creation location with one another and stores them in the storage area 51.

Upon completion of the imaging, the user can perform an operation on the input unit 74 to restore the display screen to the previous state. Then, the display screen 100b is displayed again.

The acquisition unit 115 can create the specification information. More specifically, the acquisition unit 115 respectively regards the instance when the button 101c was selected and the instance when the button 107b was selected as the starting time and the finishing time of the moving exercise. The acquisition unit 115 creates the specification information which indicates the exercise period defined as the period between the starting time and the finishing time.

The acquisition unit 115 also creates the first attribute information in such a manner that the first attribute information is associated with the specification information above. For example, in response to the selection of the button 107b, the acquisition unit 115 displays, on the display 32, a screen (not shown) for instructing the user to input the first attribute information. In response to this instruction, the user performs operations on the input unit 74 to input the weather information and the feeling information related to the relevant moving exercise.

The user may input the route information. For example, the acquisition unit 115 displays map information on the display 32. The user inputs information about the starting point and the endpoint of the movement route by performing operations (e.g., taps) on the corresponding starting point and the corresponding endpoint on the displayed map. The acquisition unit 115 can display a plurality of routes from the starting point to the endpoint on the display 32 in a selectable manner. The user can select a movement route through the input unit 74. Then, the acquisition unit 115 creates the route information based on the selected movement route.

Alternatively, the acquisition unit 115 may create the route information using the current position acquiring unit 40. For example, once the button 101c is selected, the acquisition unit 115 successively acquires current positions of the user during the moving exercise. When the button 107b is selected, the acquisition unit 115 stops acquiring current positions. The acquired current positions indicate the movement route. Thus, the route information can be created based on the movement route.

As described above, the acquisition unit 115 creates the specification information and the first attribute information, associates these two kinds of information with each other, and stores them in the storage area 52. Also, the most recently acquired pieces of information mentioned above are stored in a manner to be associated with, for example, the specification information. These pieces of information are associated with the moving exercise accordingly.

<4-2-2-2. History Display Operation>

Figure 11:
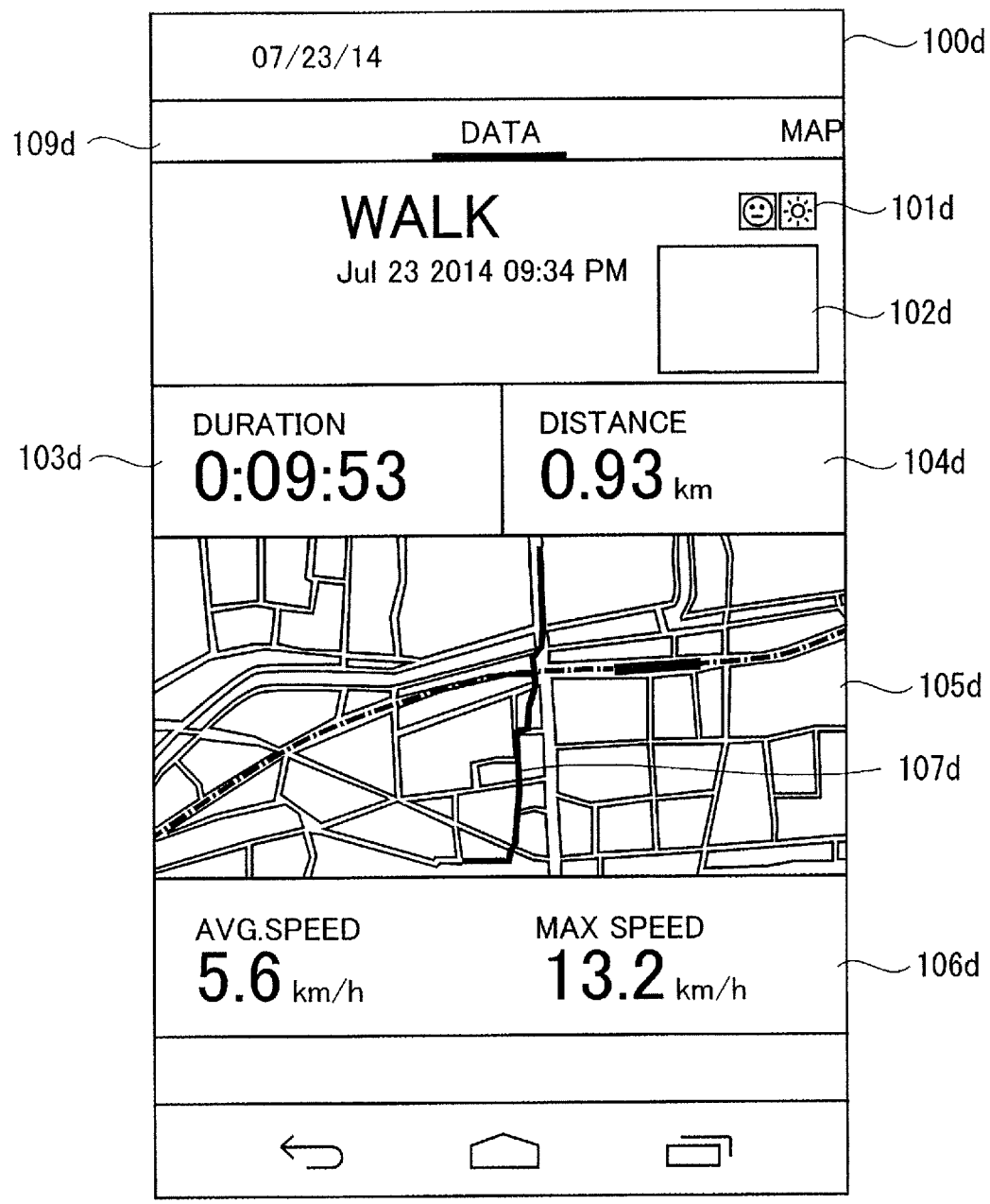
FIG. 11 schematically illustrates an example of the display screen.

With reference to FIG. 10, when the user selects the button 104c, the exercise assistance unit 113 can display the user's past moving exercises on the display 32 in list form (not shown). When the user selects one of the past moving exercises, the exercise assistance unit 113 can display, on the display 32, history information, which is a variety of information about the selected moving exercise. FIG. 11 illustrates an example of a display screen 100d. The display screen 100d shows the history information.

The display screen 100d includes an attribute information area 101d, a captured image area 102d, a movement duration area 103d, a movement distance area 104d, a movement route area 105d, and a movement speed area 106d.

In the attribute information area 101d are displayed the user's feeling information and the weather information. In the example of FIG. 11, the predetermined graphics respectively indicate that the user was in a good mood during the relevant moving exercise and that it was a sunny day. In the captured image area 102d is displayed one of the images captured during the relevant moving exercise. In the example of FIG. 11, the image is displayed in a relatively small area. Such an image is called a thumbnail. The number of images displayed in the captured image area 102d is not limited to one. Of the images captured during the relevant moving exercise, an appropriate number of images may be displayed.

Also, in the example of FIG. 11, the date and time of the image captured is displayed adjacent to the captured image area 102d.

In the movement duration area 103d and the movement distance area 104d are respectively displayed the movement duration and the movement distance related to the moving exercise. In the movement speed area 106d are displayed the average value and the maximum value of the movement speed.

In the movement route area 105d is displayed an area map including the movement route taken by the user during the relevant moving exercise. The movement route is indicated by, for example, a thick line 107d. The map information for displaying the area map may be prestored in a storage (e.g., the storage 50) or may be acquired from an external device (e.g., a server) through the wireless communication unit 20. The map information is subjected to route information mapping so that the movement route is displayed on the map.

The user can easily find, form the history display above, a variety of information about his or her past moving exercises.

The exercise assistance unit 113 can replace the display screen with another display screen in response to an input operation performed on the input unit 74 by the user. For example, the user moves an operator from right to left while keeping the operator in close proximity to or in contact with the display area 2a. Such an operation is called a "slide". In response to this operation, the exercise assistance unit 113 replaces the display screen with another display screen. FIG.

12 illustrates a display screen 100e after the replacement. The display screen 100e includes a movement route and captured image area 101e. In the movement route and captured image area 101e, an area map including a movement route is displayed in a relatively large area and the movement route is indicated by a thick line 102e. The starting point and the endpoint of the relevant movement route are respectively indicated by predetermined graphics 104e and 105e.

Figure 12:
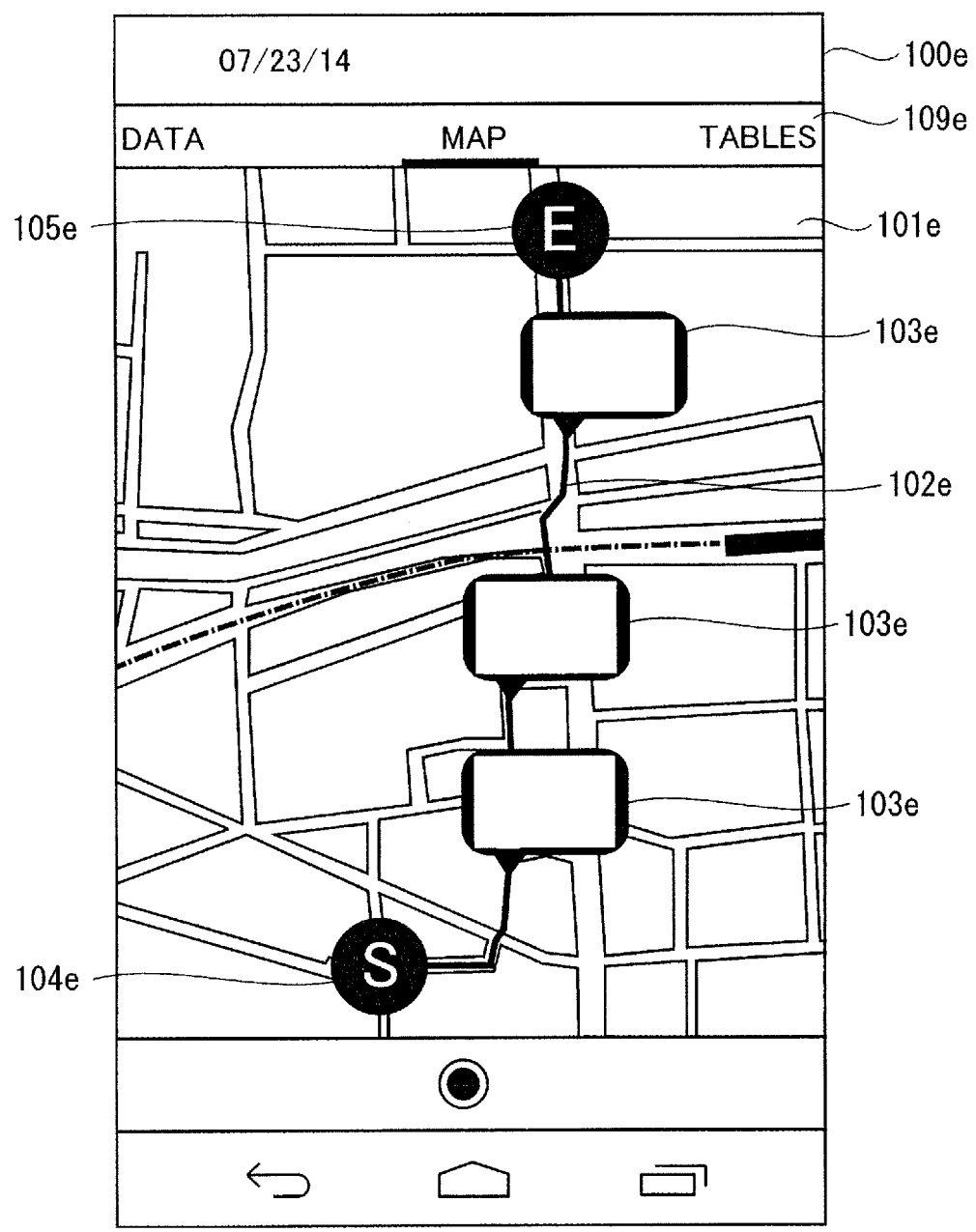
FIG. 12 schematically illustrates an example of the display screen.

The exercise assistance unit 113 can display images captured during the moving exercise based on the image creation location information associated with the images. That is to say, images created at image creation locations on the movement route are displayed in the corresponding positions on the display 32. The image creation locations can be regarded as image capture locations. With reference to FIG. 12, a plurality of captured image areas 103e are displayed. Each of the captured image areas 103a indicates a location at which an image was captured. The image captured at the location is displayed in the corresponding captured image area 103e. The user can thus easily find the location at which the image was captured. In the example of FIG. 12, the plurality of captured image areas 103e indicate their respective image capture locations that are different from one another. Thus, different images are displayed in the individual captured image areas 103e.

The display screens 100d and 100e respectively include screen title areas 109d and 109e, each of which indicates the contents of the current display screen. For example, "DATA" which is the screen title of the display screen 100d is displayed in the middle of the screen title area 109d of the display screen 100d. This means that the display screen 100d is currently displayed. Also, "MAP" which is the screen title of the display screen 100e is displayed on the right side of the screen title area 109d. This means that the display screen 100d can be replaced with the display screen 100e in response to the above-mentioned operation. Meanwhile, "MAP" is displayed in the middle of the screen title area 109e of the display screen 100e. This means that the display screen 100e is currently displayed. Also, "DATA" is displayed on the left side of the screen title area 109e. This means that the display screen 100e can be replaced with the display screen 100d in response to a slide operation of moving the operator from left to right. In the example of FIG. 12, "TABLE" is displayed on the right side of the screen title area 109e. This means that the display screen 100e can be replaced with another display screen (not shown) titled "TABLE" in response to a slide operation of moving the operator from left to right. For example, the display screen titled "TABLE" shows, in table form, the numerical information displayed on the display screen 100d.

<4-2-2-3. Startup of Second Processor Under Direction of First Processor>

In response to an input operation on the input unit 74, the second processing startup unit 111 can cause the second processor 120 to start up. For example, in response to an operation of the user on the captured image area 102d of the display screen 100d or on the individual captured image area 103e of the display screen 100e, the second processing startup unit 111 transmits a startup instruction to the second processor 120, and the second processor 120 starts up accordingly. That is to say, the captured image area 102d and the individual captured image areas 103e each function as the button for causing the second processor 120 to start up.

At the startup of the second processor 120, the sort information output unit 112 outputs the specification information and the first attribute information stored in the storage area 51 to the second processor 120 in order to notify the second processor 120 of the correspondence between the images and the first attribute information. The second processor 120 receives the specification information and the first attribute information. Although the second processor 120 does not access the storage area 51, the second processor 120 can be thus notified of the specification information and the first attribute information, which are input from the first processor 110.

Figure 13:
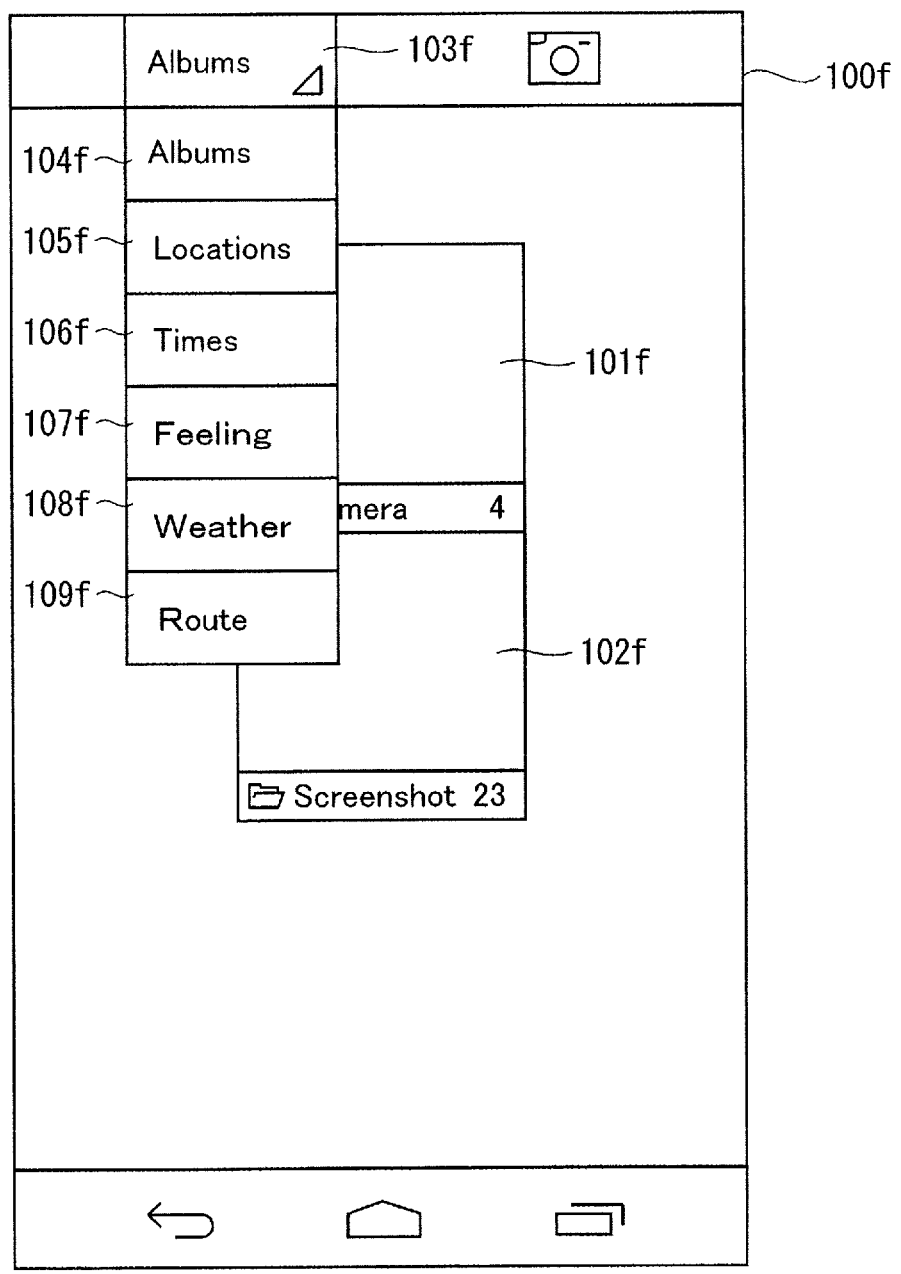
FIG. 13 schematically illustrates an example of the display screen.

When starting up in accordance with the instruction from the first processor 110, the second processor 120 can perform the sort function based not only on the second attribute information but also on the first attribute information. FIG. 13 schematically illustrates an example of a display screen 100f displayed on the display 32 by the second processor 120. Unlike in FIG. 6, the sorting rule display unit 121 displays, in a selectable manner, not only the sorting rules based on the second attribute information but also the sorting rules based on the first attribute information. Here, the first attribute information includes the feeling information, the weather information, and the route information. In the example of FIG. 13, a "Feeling" button 107f, a "Weather" button 108f, and a "Route" button 109f are displayed. The buttons 107f to 108f respectively correspond to the feeling information, the weather information, and the route information. "Feeling", "Weather", and "Route", which are display names of the respective buttons 107f to 109f, are regarded as display name information and are included in, for example, the first attribute information. The sorting rule display unit 121 performs display based on the display name information included in the first attribute information.

Album images 101f and 102f are respectively the same as the album images 101a and 102a and buttons 103f, 104f, 105f, and 106f are respectively the same as the buttons 103a, 104a, 105a, and 106a. Thus, the description thereof will not be repeated.

The buttons 103f to 109f are selectable by the user. The information display unit 122 can sort images according to the selected rule and display the sorted images on the display 32. For example, when the button 107f is selected, the information display unit 122 sorts images based on the feeling information and displays the sorted images. More specifically, the information display unit 122 specifies images based on the specification information and associates the specified images with the feeling information based on the correspondence between the specification information and the feeling information.

With reference to FIGS. 8 and 9, the information display unit 122 successively judges whether the date and time of creation of the individual image stored in the storage area 51 belongs the exercise period starting at the point of time t1 and ending at the point of time t2. Consequently, the images A and B are specified. Subsequently, based on the correspondence (FIG. 9) between the feeling information and the exercise period starting at the point of time t1 and ending at the point of time t2, the images A and B are associated with the feeling information "Good". Similarly, the images C to F captured during the exercise period starting at the point of time t3 and ending at the point of time t4 are specified, and then, the images C to F are associated with the feeling information "Indifferent". Of the images stored in the storage area 51, an image (e.g., the image G) that is not specified based on the specification information is not associated with the feeling information. In other words, the image G is associated with "No information".

Then, the information display unit 122 checks the feeling information associated with the individual images, sorts the individual images in the following exemplary order: "Good", "Indifferent", "Bad", and "No information", and displays the sorted images on the display 32. In some cases, a plurality of images are associated with the same feeling information. The individual images associated with the same feeling information may be arranged in an appropriate order. For example, the individual images may be arranged in chronological order based on the creation date and time.

According to one embodiment, unlike the immediate startup of the second processor 120 directed by the input unit 74 without involvement by the first processor 110, the startup of the second processor 120 directed by the first processor 110 can broaden the scope of the selection of sorting rules. This can improve the usability of the second processor.

As described above, the second processor 120 performs the display operation differently (FIGS. 5 and 16) depending on which one of the first processor 110 and the input unit 74 without involvement by the first processor 110 has directed the second processor 120 to start up. The user can thus select an appropriate startup procedure for the second processor 120, so that the sort display can be performed in a desired manner. The startup of the second processor 120 directed by the first processor 110 can enable the sort operation corresponding to the functions of the first processor 110.

As described above, the first attribute information is acquired while the first processor 110 executes the predetermined function (e.g., the exercise assistance function). Thus, the information (e.g. the weather and the feeling) corresponding to the predetermined function can be referred to as the first attribute information. Thus, the sort function corresponding to the predetermined function can be executed, which can improve the convenience of the user.

Furthermore, a new sort function can be easily installed by a third processor that can cause the second processor 120 to start up. For example, when the third processor outputs third attribute information associated with the specification information to the second processor 120, the second processor 120 can perform a sort function based on the third attribute information. This means that the third processor can install the additional sort function without altering the second processor 120.

Figures 14, 15:
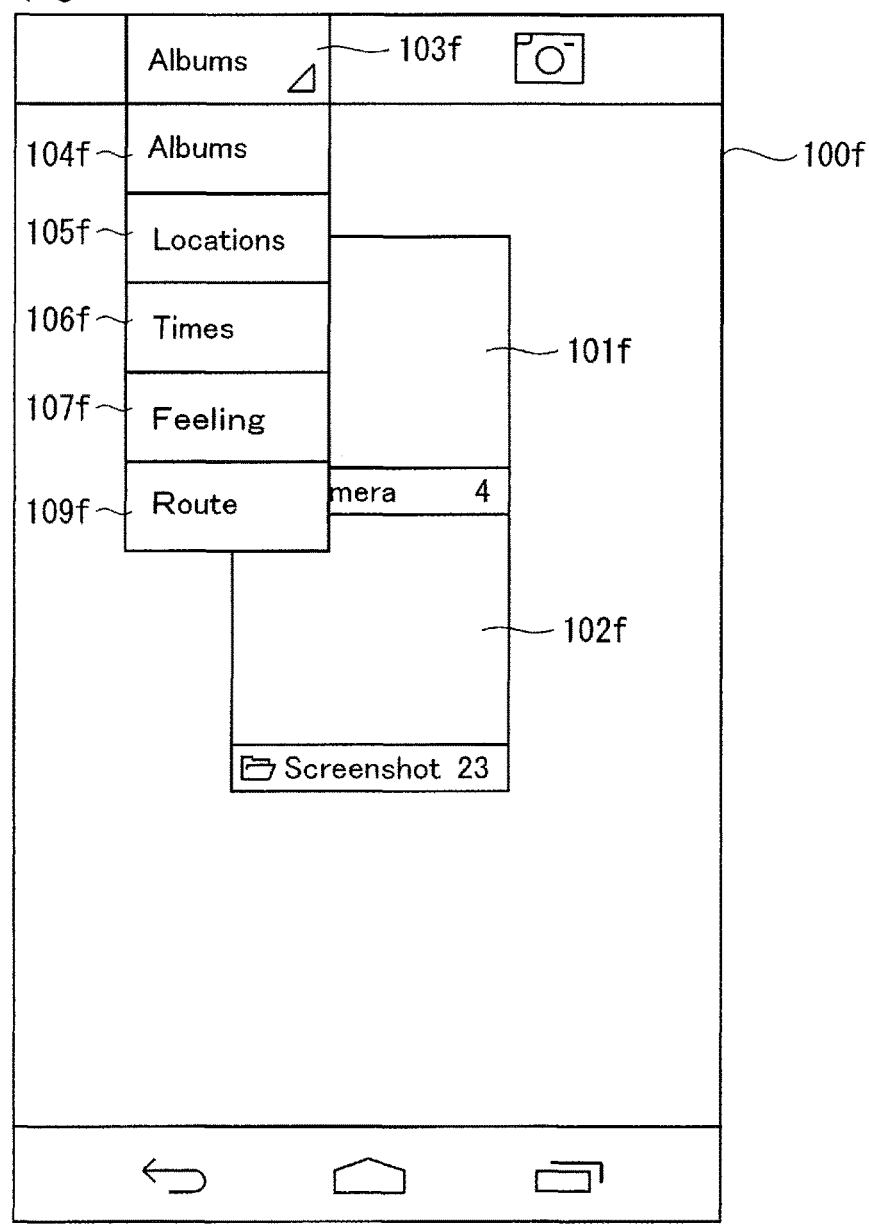
FIG. 14 illustrates an example of the correspondence between the specification information and the first attribute information.
FIG. 15 schematically illustrates an example of the display screen.

When inputting the first attribute information through the input unit 74, the user does not necessarily provide information corresponding to every category of the first attribute information per moving exercise. For example, the user does not input the weather information in some cases. FIG. 14 schematically illustrates an example of the correspondence between the specification information and the first attribute information in the above case. As illustrated in FIG. 14, none of the weather information fields include weather information.

In this case, the sorting rule based on the weather information does not need to be displayed. Before displaying sorting rules, the sorting rule display unit 121 judges whether the first attribute information is obtained for each category. For example, the sorting rule display unit 121 judges whether the weather information associated with the individual piece of specification information is obtained, whether the feeling information associated with the individual piece of specification information is obtained, and whether the route information associated with the individual piece of specification information is obtained.

If the first attribute information associated with at least one piece of specification information is obtained, the sorting rule based on the relevant category of the first attribute information is displayed. In the example of FIG. 14, the feeling information associated with at least one piece of specification information and the route information associated with at least one piece of specification information are obtained. Thus, as illustrated in FIG. 15, the buttons 107*f* and 109*f* respectively corresponding to the feeling information and the route information are displayed in a selectable manner. Meanwhile, if the first attribute information associated with every piece of specification information is failed to be obtained, the sorting rule based on the relevant first attribute information is not displayed. In the example of FIG. 14, the weather information associated with every piece of specification information is failed to be obtained. Thus, as illustrated in FIG. 15, the button 108*f* corresponding to the weather information is not displayed.

Figure 16:
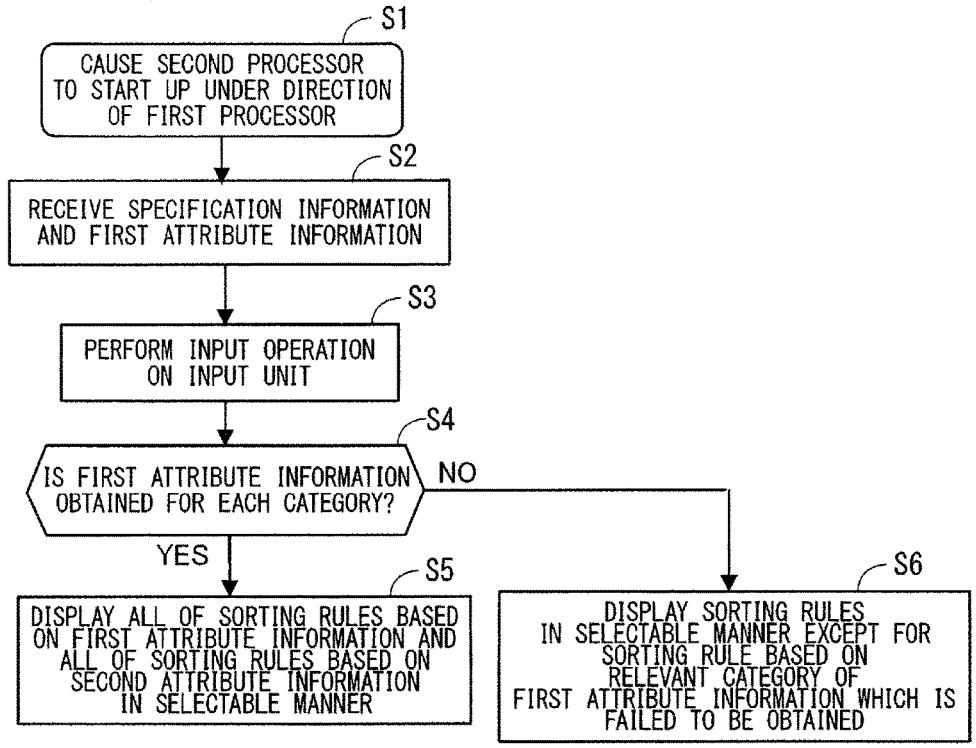
FIG. 16 illustrates a flowchart for describing an example of the operation of a sorting rule display unit.

FIG. 16 illustrates a flowchart for describing an example of the above-mentioned operation of the sorting rule display unit 121. In Step S1, the first processor 110 directs the second processor 120 to start up. In Step S2, the second processor 120 receives the specification information and the first attribute information from the first processor 110.

Then, in Step S3, the user performs an input operation on input unit 74 such that sorting rules are displayed. In response to the input operation, the sorting rule display unit 121 successively determines, in Step S4, whether the first attribute information associated with the individual pieces of specification information is obtained. If it is determined, in Step S4, that the first attribute information associated with at least one piece of specification information is obtained for every category of the first attribute information, in Step S5, the sorting rule display unit 121 displays all of the sorting rules based on the second attribute information and all of the sorting rules based on the first attribute information (FIG. 13). Meanwhile, if it is determined, in Step S4, that the first attribute information associated with every piece of specification information is failed to be obtained, in Step S6, the sorting rule display unit 121 does not display the sorting rule based on the relevant category of the first attribute information which has been failed to be obtained and displays other sorting rules (the sorting rules based on the second attribute information and the sorting rules based on the individual categories of the obtained first attribute information) in a selectable manner (FIG. 15).

The operation above can eliminate sort options unnecessary for the user, thus further improving the usability of the second processor 120.

The second processor 120 includes the information deleting unit 123, which enables the user to selectively delete images stored in the storage area 51. If the user makes such deletions, images (e.g., the images A to F) to be specified based on the specification information are no longer stored in the storage area 51. Thus, the sorting rule display unit 121 may be configured to determine whether images to be specified based on the specification information are stored in the storage area 51 before displaying sorting rules. Upon a positive determination, the sorting rule display unit 121 displays not only the sorting rules based on the second attribute information but also the sorting rules based on the first attribute information in a selectable manner. Upon a negative determination, the sorting rule display unit 121, which has received the first attribute information, does not display the sorting rules based on the first attribute information and displays the sorting rules based on the second attribute information in a selectable manner.

Figure 17:
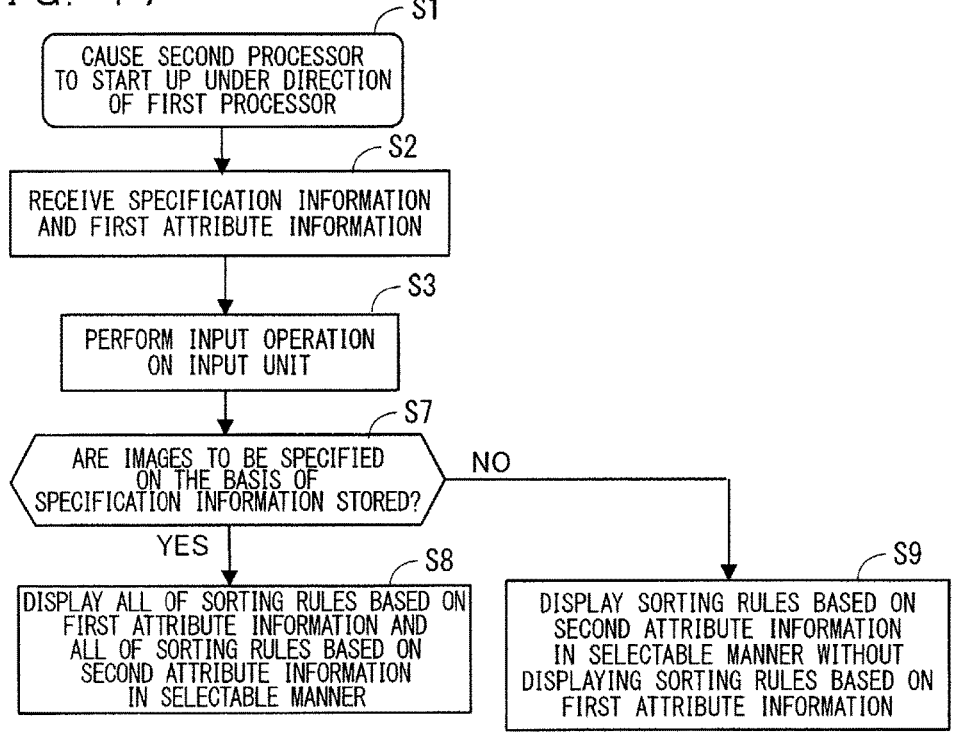
FIG. 17 illustrates a flowchart for describing an example of the operation of the sorting rule display unit.

FIG. 17 illustrates a flowchart for describing an example of the above-mentioned operation of the sorting rule display unit 121. Steps S4 to S6 of FIG. 16 are replaced with Steps S7 to S9. In response to an input operation in Step S3, the sorting rule display unit 121 determines, in Step S7, whether images to be specified based on the specification information are stored in the storage area 51. If it is determined, in Step S7, that the relevant images are stored, in Step S8, the sorting rule display unit 121 displays all of the sorting rules based on the second attribute information and all of the sorting rules based on the first attribute information (FIG. 13). Meanwhile, if it is determined, in Step S7, that the relevant images are not stored, in Step S9, the sorting rule display unit 121 displays the sorting rules based on the second attribute information in a selectable manner without displaying sorting rules based on the first attribute information (FIG. 6).

In the above-mentioned operation, when images associated with the first attribute information are not stored in the storage area 51, the sorting rules based on the first attribute information are not displayed. This can eliminate sort options unnecessary for the user, thus further improving the usability of the second processor 120.

The operation of FIG. 16 and the operation of FIG. 17 may be combined. FIG. 18 illustrates a flowchart for describing an example of the operation of the sorting rule display unit 121. In the example of FIG. 18, if a positive determination is made in Step S7, Steps S4 to S6 of FIG. 16 are executed in place of Step S8 of FIG. 17. Specifically, (i) when images to be specified based on the specification information are not stored in the storage area 51, the sorting rules based on the second attribute information are displayed while all of the sorting rules based on the first attribute information are not displayed, regardless of whether the first attribute information is obtained for each category (S7, S9). (ii) When images to be specified based on the specification information are stored in the storage area 51 and the first attribute information associated with every piece of specification information is failed to be obtained, the sorting rule based on the relevant category of the first attribute information which is failed to be obtained is not displayed and other sorting rules are displayed (S7, S4, S6). (iii) When images to be specified based on the specification information are stored in the storage area 51 and the first attribute information associated with at least one piece of specification information is obtained for every category of the first attribute information, all of the sorting rules based on the second attribute information and all of the sorting rules based on the first attribute information are displayed (S7, S4, S5).

As described above, in one embodiment, when images associated with the first attribute information are stored in the storage area 51, the sorting rules based on the first attribute information are displayed on the display 32 in a selectable manner. When images associated with the first attribute information are not stored in the storage area 51, a first sort display is performed, where the sorting rules based on the first attribute information are not displayed on the display 32. This can eliminate sort options unnecessary for the user, thus further improving the usability of the second processor 120.

When the first attribute information is not stored in the storage area 52, as a matter of course, images associated with the first attribute information are not stored in the storage area 51. In this case, the sorting rule display unit 121 does not display a first sorting rule (a sorting rule based on the first attribute information) (FIG. 16). That is to say, the first sorting rule is not displayed, which means that this operation of FIG. 16 is another example of the first sort display.

<5. Modifications>
<5-1. Specification Information>

In the description above, the specification information includes the exercise period, which is not limited thereto. Note that the specification information preferably includes the information related to the second attribute information, which is created by the already-existing imaging processor 130. Thus, the imaging processor 130 does not need to newly create information for associating an image with the specification information. This can eliminate the need for altering the imaging processor 130, thus reducing production costs.

In some embodiments, the specification information includes, for example, the route information. When an image creation location identified on the basis of the image creation location information belongs to a route identified on the basis of the route information, the relevant image is specified. That is to say, the image captured on the movement route is specified. Then, this specification information is associated with the first attribute information. In a case where a plurality of images are captured at the corresponding locations on the movement route, the plurality of images are to be specified on the basis of the specific information. In this case, the plurality of images are grouped to be indirectly associated with the first attribute information, similarly to the above.

In some embodiments, the specific information includes, for example, the image creation date and time information. When the creation date and time information associated with an image agrees with the image creation date and time information identified on the basis of the specification information, the relevant image is specified. In this case, each image can be individually associated with the first attribute information. For example, when inputting the first attribute information, the user provides the first attribute information for each image.

In some embodiments, the specific information includes, for example, the image creation location information. When the creation location information associated with an image agrees with the image creation location information identified on the basis of the specific information, the relevant image is specified.

<5-2. First Attribute Information>

In the description above, examples of the first attribute information include the weather information, the feeling information, and the route information. In some embodiments, the first attribute information includes a variety of information about moving exercises (e.g., information on variations caused by an exercise including the movement distance, the movement speed, the calorie consumption, or biological information that varies depending on the exercise load). Examples of the first attribute information are not limited to the above.

<5-3. Display Target Information>

In the description above, the display target information includes an image, which is not limited thereto. The display target information can be changed as appropriate. The display target information may refer to, for example, a sound. Such a sound can be generated using, for example, the voice input unit 90.

<5-4. First Processor>

In the description above, the exercise assistance unit 113 has the exercise assistance functions designed for outdoor moving exercises. In some embodiments, the exercise assistance unit 113 has exercise assistance functions designed for indoor exercises. For example, during a treadmill (also called a running machine) exercise, the virtual moving speed, the virtual moving distance, and the like may be acquired from a treadmill and may be displayed.

It is not always required that the first processor 110 include the exercise assistance unit 113. In some embodiments, the first processor 110 includes, for example, a cooking support unit in place of the exercise assistance unit 113. The cooling support unit can display, for example, a recipe on the display 32. The user can perform an input operation on the input unit 74 in order to capture an image of a dish prepared according to the recipe. In response to the input operation, the imaging startup unit 114 can cause the imaging processor 130 to start up. The imaging processor 130 can capture an image of the dish using the imaging unit 60. The acquisition unit 115 can create specification information (e.g., creation date and time information) for specifying the image, and can also create first attribute information associated with the specification information. The first attribute information includes, for example, workload information (Easy, Average Difficulty, Time Consuming) associated with the preparation of the dish and taste rating information (Delicious, Average Taste, Bad). The first attribute information is input through, for example, the input unit 74.

While the electronic apparatus has been described above in detail, the foregoing description is in all aspects illustrative and not restrictive. It is understood that numerous modifications which have not been exemplified can be devised without departing from the scope of the present disclosure.

Embodiments of the present disclosure are applicable in combination as long as they are consistent with each other.

What is claimed is:

1. An electronic apparatus comprising:
   a display,
   an input unit, and
   at least one processor including a first functional unit and a second functional unit,
   the first functional unit configured to
   (i-1) execute a predetermined function,
   (i-2) acquire, during execution of the predetermined function, first attribute information associated with a first sorting rule, and
   (i-3) store the first attribute information in a first storage area, the second functional unit configured to
   (ii-1) display, on the display, a plurality of pieces of display target information-including a plurality of pieces of first display target information acquired during the execution of the predetermined function and stored in a second storage area, the plurality of pieces of display target information being associated with second attribute information, the second attribute information being associated with a second sorting rule and stored in the second storage area,
   (ii-2) in a first mode when the second functional unit is started up by the first functional unit, perform a first sort display function in which (ii-2-1) the second sorting rule is displayed and the first sorting rule is displayed on the display when at least one of the plurality of pieces of first display target information stored in the second storage area is associated with the first attribute information and (ii-2-2) the second sorting rule is displayed but the first sorting rule is not displayed on the display when none of the plurality of pieces of first display target information stored in the second storage area are associated with the first attribute information, and
   (ii-3) in a second mode when the second functional unit is started up by an operation performed on the input unit, without involvement by the first functional unit, perform a second sort display function in which the second sorting rule is displayed but the first sorting rule is not displayed regardless of whether any of the plurality of pieces of first display target information are associated with the first attribute information,
   (ii-4) receive a selection of the first sorting rule or the second sorting rule using the input unit, and
   (ii-5) sort the plurality of pieces of first display target information according to the first sorting rule or the second sorting rule selected by using the input unit, and display the sorted pieces of first display target information on the display in accordance with the selected sorting rule.

2. The electronic apparatus according to claim 1, wherein when the first attribute information is not stored in the first storage area, the second functional unit does not display the first sorting rule on the display.

3. The electronic apparatus according to claim 1, wherein
   the first storage area is not accessible by the second functional unit but is accessible by the first functional unit, and
   the first attribute information is transmitted from the first functional unit to the second functional unit.

4. The electronic apparatus according to claim 1, wherein
   the first functional unit acquires, during the execution of the predetermined function, specification information for specifying the plurality of pieces of first display target information, and
   when the first sorting rule is selected, the second functional unit sorts, according to the first sorting rule, the plurality of pieces of first display target information associated with the second attribute information related to the specification information and displays the sorted pieces of first display target information.

5. The electronic apparatus according to claim 4, wherein
   the second attribute information comprises a plurality of pieces of information each indicating a date and time of creation of each of the plurality of pieces of display target information,
   the specification information comprises information indicating a predetermined period of time, and
   when the date and time belongs to the predetermined period of time, the second functional unit regards the date and time as the second attribute information related to the specification information.

6. The electronic apparatus according to claim 5, wherein
   in executing the predetermined function, the first functional unit acquires information related to an exercise performed by a user and displays the information on the display, and
   the first functional unit acquires a period of time over which the exercise is performed, the period of time being regarded as the specific information.

7. The electronic apparatus according to claim 6, wherein the first attribute information comprises at least one of information on a feeling of the user, information on a weather, or information on a route taken by the user during the exercise.

8. The electronic apparatus according to claim 1, wherein each of the plurality of pieces of display target information comprises an image.

9. The electronic apparatus according to claim 1, wherein the first functional unit acquires the first attribute information in response to an input operation performed by using the input unit.

10. The electronic apparatus according to claim 1, wherein
- each of the plurality of pieces of display target information comprises a captured image, and
- the first functional unit
    - acquires a movement route taken by a user during a moving exercise and displays the movement route on the display, and
    - causes an image captured at a location on the movement route to be displayed in a corresponding position on the movement route displayed on the display.

* * * * *